United States Patent [19]
Pullukat et al.

[11] Patent Number: 6,001,764
[45] Date of Patent: Dec. 14, 1999

[54] OLEFIN POLYMERIZATION CATALYSTS WITH SPECIFIC SILICA SUPPORTS

[75] Inventors: Thomas J. Pullukat, Lansdale; Ronald S. Shinomoto, Schwenksville; Reinhard H. Witt, Wyncote, all of Pa.

[73] Assignee: PQ Corporation, Valley Forge, Pa.

[21] Appl. No.: 09/075,279

[22] Filed: May 8, 1998

[51] Int. Cl.$^6$ ........................................ B01J 31/00
[52] U.S. Cl. ................ 502/103; 502/102; 502/115; 502/117; 502/120
[58] Field of Search ...................... 502/102, 103, 502/107, 110, 113, 115, 116, 117, 120

[56] References Cited

U.S. PATENT DOCUMENTS

| | | | |
|---|---|---|---|
| 2,825,721 | 3/1958 | Hogan et al. ........................... | 260/88.1 |
| 3,784,539 | 1/1974 | Ort ......................................... | 260/94.9 |
| 3,787,384 | 1/1974 | Stevens et al. ......................... | 260/94.9 |
| 4,053,435 | 10/1977 | Lynch ..................................... | 252/451 |
| 4,303,770 | 12/1981 | Pullukat et al. ........................ | 526/96 |
| 4,560,733 | 12/1985 | Matin nee Sturdyset al. ......... | 526/129 |
| 4,672,096 | 6/1987 | Nowlin .................................. | 526/116 |
| 4,701,432 | 10/1987 | Welborn, Jr. .......................... | 502/113 |
| 4,791,089 | 12/1988 | Dombro et al. ........................ | 502/286 |
| 4,808,561 | 2/1989 | Welborn, Jr. .......................... | 502/104 |
| 4,950,631 | 8/1990 | Buehler et al. ........................ | 502/119 |
| 5,057,475 | 10/1991 | Canich et al. .......................... | 502/104 |
| 5,064,798 | 11/1991 | Chang .................................... | 502/111 |
| 5,155,079 | 10/1992 | Cribbs et al. .......................... | 502/113 |
| 5,198,399 | 3/1993 | Hoff et al. .............................. | 502/111 |
| 5,198,400 | 3/1993 | Katzen et al. .......................... | 502/113 |
| 5,232,883 | 8/1993 | Derleth e tal. ......................... | 502/5 |
| 5,362,824 | 11/1994 | Furtek et al. ........................... | 526/114 |

FOREIGN PATENT DOCUMENTS 28 46 185   5/1980   United Kingdom ............ C08F 10/00

OTHER PUBLICATIONS

T.J. Pullukat and R. Shinomoto, "Microspherical Silica Supports With High Pore Volume For Metallocene Catalasts," Presented at Metallocenes Europe '97, Dusseldorf, Germany, Apr. 8–9, 1997, pp. 1–11.

*Primary Examiner*—Elizabeth Wood
*Attorney, Agent, or Firm*—Ratner & Prestia

[57] ABSTRACT

A catalyst having a high pore volume, high surface area porous silica support and a non-metallocene, Ziegler-Natta catalytic component incorporated on the silica support is provided for the production of polyolefins from α-olefins. The porous silica support is made up of silica gel particles having an average surface area of about 600 to about 800 $m^2/g$ of silica and an average pore volume of about 2.5 to about 4.0 ml/g of silica. Preferably, the silica particles have an average surface area of about 650 to about 750 $m^2/g$ of silica and an average pore volume of about 2.75 to about 3.25 ml/g of silica. Even more preferably, the silica particles have an average surface area of about 700 $m^2/g$ of silica and an average pore volume of about 3.0 ml/g of silica. The catalytic component comprises a complex product of a transition metal halide and a metal alkyl which excludes cyclopentadienyl rings.

9 Claims, No Drawings

OLEFIN POLYMERIZATION CATALYSTS WITH SPECIFIC SILICA SUPPORTS

FIELD OF THE INVENTION

This invention relates to olefin polymerization catalysts having porous, silica supports.

BACKGROUND OF THE INVENTION

Chromium and Ziegler-Natta polymerization catalysts have been known since the 1950's. Thermally activated chromium catalysts were disclosed in U.S. Pat. No. 2,825,721 and are commonly referred to as Phillips catalysts. Catalysts containing chromium may also contain additional components such as titanium, aluminum, boron, and vanadium, as disclosed in U.S. Pat. No. 4,303,770.

Ziegler-Natta catalysts can be broadly described as consisting of combinations of strong reducing agents, such as an organometallic compound of an alkali metal or an alkaline earth metal (such as aluminum and magnesium), in combination with various reducible heavy metal compounds, such as the halides and alkoxides of the metals in Groups IVB, VB, and VIB of the Periodic Table. Ziegler-Natta catalysts are commonly supported on $MgCl_2$, but silica-supported Ziegler-Natta catalysts are also known.

Other types of silica-supported Ziegler-Natta catalysts which are known in the prior art include:

A. The multiple site type, for example, the catalysts disclosed in U.S. Pat. No. 5,155,079, which discloses a zirconium compound and a vanadium or titanium compound deposited on silica particles;

B. The metallocene type compounds in which the transition metal compound, a bis (cyclopentadienyl) metallocene, especially a zirconocene, as disclosed in U.S. Pat. No. 4,701,432, or a monocyclopentadienyl compound of zirconium, hafnium, or titanium, as disclosed in U.S. Pat. No. 5,057,475; and C. Catalysts for isotactic propylene as in U.S. Pat. No. 4,950,631.

U.S. Pat. No. 3,787,384 discloses catalyst synthesis by reaction of silica with an organomagnesium compound and subsequent treatment of the product with titanium tetrachloride. The particulate catalyst that is obtained is activated with an aluminum alkyl cocatalyst. U.S. Pat. No. 3,748,539 discloses a similar use for silica in catalyst synthesis, but the silica particles are first modified by reaction with an organoaluminum compound, and the transition metal is vanadium. U.S. Pat. No. 4,808,561 discloses a silica-supported metallocene catalyst prepared by reaction of methylaluminoxane with silica, followed by treatment with a zirconocene. In all of these disclosures, the porous silica is of relatively low pore volume, surface area, and surface functionality.

U.S. Pat. No. 4,701,432 (mentioned above) discloses an olefin polymerization catalyst comprising (a) a supported transition metal containing component comprising the support treated with at least one metallocene and at least one non-metallocene transition metal compound, and (b) a cocatalyst comprising an aluminoxane and an organometallic compound of a metal of groups IA, IIA, IIB, or IIIA of the periodic table. Although the patent discloses a support of an inorganic oxide with surface areas of between 50 to 1000 $m^2/g$ and a pore volume of between 0.5 to 3.5 ml/g, the patent mentions that the specific particle size, surface area, pore volume, and number of surface hydroxyl groups are not critical to the patent's utility.

U.S. Pat. No. 5,232,883 discloses a process for obtaining high surface area silica particles with catalysts supported thereon. The process includes the step of spraying an electrostatically charged gellable liquid material into a chamber to produce macrodrops within which gelling is produced after spraying. The process of the '883 patent is utilized only with chromium-containing catalytic components.

U.S. Pat. No. 4,791,089 discloses a method of preparing a high pore volume, medium surface area zirconia-titania-silica tergel useful as an olefin polymerization or co-polymerization catalyst support. In particular, this patent discloses a pore volume in the range of about 1.5 to 3.5 cc/g and a surface area in the range of about 200 to 600 $m^2/g$.

In olefin polymerization, it is desirable to develop a catalyst with high activity which produces polymers with high bulk density and good morphology.

SUMMARY OF THE INVENTION

The present invention provides silica-containing catalysts for the polymerization of α-olefins. The catalysts comprise a high volume, high surface area, porous silica support and a Ziegler-Natta catalytic component comprising a complex product of a transition metal halide and a metal alkyl incorporated on the silica support. In particular, the porous silica support comprises silica gel particles having an average surface area of about 600 to about 800 $m^2/g$ of silica and an average pore volume of about 2.5 to about 4.0 ml/g of silica. The transition metal halide and the metal alkyl according to the present invention exclude cyclopentadienyl rings. Accordingly, the Ziegler-Natta catalytic component of the present invention is non-metallocene.

Preferably, the silica particles have an average surface area of about 650 to about 750 $m^2/g$ of silica and an average pore volume of about 2.75 to about 3.25 ml/g of silica. Even more preferably, the silica particles have an average surface area of about 700 $m^2/g$ of silica and an average pore volume of about 3.0 ml/g of silica.

The porous silica support used with the present invention can also be defined by silica gel particles having a ratio of average pore volume (in ml/g) to average surface area (in $m^2/g$) of from about 0.0031:1 to about 0.0067:1. Preferably, this ratio is between about 0.0037:1 to 0.0050:1 and, most preferably, about 0.0043:1.

It is to be understood that both the foregoing general description and the following detailed description are exemplary, but are not restrictive, of the invention.

DETAILED DESCRIPTION OF THE INVENTION

In accordance with the present invention, a catalyst having a high pore volume, high surface area, porous silica support is provided for the production of polymers from α-olefins, such as ethylene, propylene, 1-butene, 1-hexene and 1-octene.

As mentioned above, the present invention is directed to a silica-containing α-olefin polymerization catalyst made up of a porous silica support component and a catalytic component incorporated on the support. The silica support is made up of silica gel particles. The silica support component which can be incorporated into the catalysts of the present invention may be those available from commercial sources or can be made by art-accepted processes using methods of preparation and purification known in the prior art. For example, U.S. Pat. Nos. 4,701,432 and 5,232,883, incorporated herein by reference, disclose processes for producing such a support. Of course, the silica gel particles of the present invention have the ranges of surface areas and pore volumes as specified below, and silica gel particles having these ranges can easily be prepared by one skilled in the art.

According to the present invention, the gel particles have an average surface area of about 600 to 800 m²/g of silica and an average pore volume of about 2.5 to about 4.0 ml/g of silica. Preferably, the porous silica support component of the catalyst according to the present invention has an average surface area of 650 to 750 m²/g and an average pore volume of from about 2.75 to about 3.25 ml/g. Most preferably, the porous silica support component of the catalyst according to the present invention has an average surface area of 700 m²/g and an average pore volume of about 3.0 ml/g.

In view of the following relationship between surface area and pore volume, the characteristics of the porous silica support of the present invention can be expressed as a ratio of average pore volume (ml/g) to average surface area (m²/g):

$$D = \frac{40,000 \times V}{A}$$

wherein, D=pore diameter in Angstroms;
V=pore volume in ml/g; and
A=surface area in m²/g.

Thus, the silica gel particles of the porous silica support component have a ratio of average pore volume (in ml/g) to average surface area (in m²/g) of from about 0.0031:1 to about 0.0067:1, more preferably between about 0.0037:1 to 0.0050:1, and most preferably about 0.0043:1.

The silica gel particles may have an average diameter of from about 20 micrometers to about 200 micrometers and an average total surface hydroxyl content of from about 0.6 mmol/g to about 4.0 mmol/g. The pore volume and average surface area specified above should include substantially all of the particles of the porous silica support component.

The shape of the particles which make up the silica component may be spherical and/or granular, although it is preferable that the particles be spherical for better flowability into the reactor and for producing polymer particles with good, spherical morphology and high bulk density. If there are spherical-shaped and granular-shaped particles in a mixture, both types individually must have the specified pore volume and surface area distributions. The silica support component of the present invention may contain up to a total of 5% weight/weight (w/w) of a compound including titanium, aluminum, boron, magnesium or other elements. The silica support component of the catalyst of the present invention must contain of from about 60 to about 98% and preferably at least 80% w/w silica. Regardless of the particular catalytic component selected, at least 50% of the initial pore volume of the silica support must remain in the catalysts after synthesis.

As for the particular catalytic component used in the present invention, any known Ziegler-Natta catalytic component which is not metallocene, as defined below, can be used in the present invention. A metallocene catalytic component is an organometallic coordination compound obtained as a cyclopentadienyl derivative of a transition metal or metal halide. There are three general types of metalocenes: (a) dicyclopentadienyl metals with the general formula $(C_5H_5)_2M$; (b) dicyclopentadienyl metal halides with the general formula $(C_5H_5)_2MX_{1-3}$; and (c) monocyclopentadienyl metal compounds with the general formula $C_5H_5MR_{1-3}$, where R is CO, NO, a halide group, or an alkyl group, among others. Most metallocenes are crystalline. The most important industrial methods of deriving metallocenes is the reaction of a cyclopentadienide with a transition metal halide in an organic solvent. Thus, the catalytic component of the present invention is formed from constituents which are not cyclopentadienyl derivatives.

More specifically, the Ziegler-Natta catalytic component of the present invention comprises a complex product of a metal alkyl and a transition metal halide. Preferably, the metal of the metal alkyl is magnesium or aluminum and, most preferably, magnesium. The alkyl group of the metal alkyl is preferably non-aromatic and contains between 1 and 18 carbon atoms, and preferably from 2 to 8. An exemplary alkyl group is butyl and ethyl.

As used herein, the term "transition metal halide" excludes cyclopentadienyl derivatives thereof. Preferably, the transition metal halide has the formula $MX_4$, wherein X is a halide or an alkoxy halide having an alkyl group between 1 and 10 carbon atoms. Preferably, the transition metal is titanium, vanadium, or zirconium and, most preferably, titanium. Preferably, the halide is chloride. As used in the examples below, $TiCl_4$ is a preferred transition metal halide.

The catalysts according to the present invention are produced by contacting the silica component discussed above with a catalytic component in a conventional manner as is known in the art. Preferably the carrier is contacted with a solution of the transition metal compound in a suitable solvent in which the compound is at least partially soluble and which is liquid at reaction temperatures. Such solvents include hexane, heptane, octane, nonane, and decane. Typically, the catalytic component attaches itself to the support at active sites of the support, which include hydroxyl groups. The catalytic component attaches itself at both internal and external locations of the support, with the internal attachments being the majority. In this way, the catalytic component is said to be "incorporated on" the silica support. Alternatively, a non-metallocene, Ziegler-Natta catalytic compound can simply be physically mixed with a silica.

Regardless of the way in which the catalytic compound is incorporated on the silica support, the material obtained is treated in known ways to obtain the catalysts for the polymerization of alpha-olefins.

The catalysts of the present invention may be used in gas or slurry phase processes, both processes being known by those skilled in the art of polymerizing olefins. The polymerization may be conducted at a temperature in the range of from about 0 to 160° C. or higher and under atmospheric, subatmospheric or superatmospheric conditions. In a slurry polymerization, a suspension of solid, particulate polymer is formed in a liquid polymerization medium containing a monomer or monomers, to which hydrogen and a catalyst are added. Solvents used in the polymerization medium include propane, 2-butane, cyclopentane and the like. Gas-phase polymerization processes utilize superatmospheric pressures and temperature ranges of from about 80° C. to about 105° C. The polymerization is performed in a stirred or fluidized bed of catalyst and product particles in a pressure vessel. Monomers, hydrogen and optionally an inert diluent gas, such as nitrogen, are introduced into the vessel while maintaining the required temperature range. The formed polymer can be withdrawn continuously. The polymer obtained can be extruded into water and cut into the desired shapes.

It is believed that silica supports of the present invention provide more accessible anchoring sites for catalytic components. Thus, the loading of the catalytic components can be increased. A higher pore volume and higher pore diameter translates to better catalyst fragmentation during polymerization.

Total surface hydroxyl content may vary from 2.5 to 4.0 mmol/g after drying at 200° C. for five hours, depending on the surface area of the silica support. This silica may be treated with silane, phosphorous compounds, etc., to convert silanol groups to organo-oxy groups. These groups can be used to support several types of non-metallocene, Ziegler-Natta catalysts. After silane treatment, surface hydroxyl content may vary from 0.30 to 1.3 mmol/g, depending on the surface area of the support.

In order to take full advantage of the support, there are known preferred limits to the loading of non-metallocene, Ziegler-Natta reagents on silica. Thus, for catalysts made with organomagnesium reagents and titanium tetrachloride, the loading is also 0.5 mmoles to 2.5 mmoles per gram of silica. Also, similar limits are preferred for vanadium catalysts, and in the case of multisite catalysts, the total amount of transition metal should not exceed the above limit.

The polyolefins of this invention are polyethylene, polyethylene copolymers with propylene, 1-butene, 1-hexene, 1-octene, 4-methyl-1-pentene, cycloolefins, and dienes, isotactic and syndiotactic polypropylene, syndiotactic polystyrene, and other olefin polymers which form as solids under the conditions of known gas phase and slurry polymerization processes.

The following examples will further illustrate the essential features of the present invention.

EXAMPLE 1

Invention 1

Catalyst Synthesis

All procedures were performed under a dry nitrogen atmosphere.

In a 250 ml 3-neck round bottom flask equipped with paddle stirrer, 5.0 grams of a high pore volume (3.0 cc/g), high surface area (700 m$^2$/g) microspherical silica support chemically treated to convert silanol groups to trimethylsiloxy groups (PQ designation MS-3070F, dried ten hours under a nitrogen purge at 150° C.) was slurried in 100 ml heptane. Next, 8.6 ml of butylethylmagnesium in heptane (0.67 mmol/ml) was added to the silica/heptane slurry. It was stirred for one hour. Then, 9.9 ml of TiCl$_4$ in heptane (0.58 mmol/ml) was added to the flask. It was stirred for one hour. The slurry mixture was filtered and all solvents removed from the collected solid under a nitrogen purge. Catalyst yield was 5.3 grams of dark brown free-flowing powder.

COMPARATIVE EXAMPLE 1

In a 250 ml 3-neck round bottom flask equipped with paddle stirrer, 5.0 grams of a high pore volume (3.0 cc/g), medium surface area (400 m$^2$/g) microspherical silica support chemically treated to convert silanol groups to trimethylsiloxy groups (PQ designation MS-3040F, dried ten hours under a nitrogen purge at 150° C.) was slurried in 125 ml heptane. Next, 7.0 ml of butylethylmagnesium in heptane (0.67 mmol/ml) was added to the silica/heptane slurry. It was stirred for one hour. Then, 7.6 ml of TiCl$_4$ in heptane (0.62 mmol/m) was added to the flask. It was stirred for one hour. The slurry mixture was filtered and all solvents removed from the collected solid under a nitrogen purge. Catalyst yield was 5.9 grams of dark brown free-flowing powder.

INVENTIVE EXAMPLE 2

In a 250 ml 3-neck round bottom flask equipped with paddle stirrer, 5.0 grams of MS-3070F silica support (dried ten hours under a nitrogen purge at 150° C.) was slurried in 100 ml heptane. Next, 8.2 ml of butylethylmagnesium in heptane (0.67 mmol/ml) was added to the silica/heptane slurry. It was stirred for one hour. Then, 2.1 ml of 1-butanol in heptane (2.63 mmol/ml) was added to the flask. It was stirred for one hour. Then, 9.5 ml of TiCl$_4$ in heptane (0.58 mmol/ml) was added to the flask. It was stirred for one hour. The slurry mixture was filtered and all solvents removed from the collected solid under a nitrogen purge. Catalyst yield was 5.3 grams of red brown free-flowing powder.

INVENTIVE EXAMPLE 3

In a 250 ml, 3-neck round bottom flask equipped with paddle stirrer, 3.0 grams of a high pore volume (3.0 cc/g), high surface area (600 m$^2$/g) microspherical silica support chemically treated to convert silanol groups to trimethylsiloxy groups (PQ designation MS-3060F, dried ten hours under a nitrogen purge at 150° C.) was slurried in 100 ml heptane. Next, 4.9 ml of butylethylmagnesium in heptane (0.67 mmol/ml) was added to the silica/heptane slurry. It was stirred for one hour. Then 1.5 ml of 1-butanol in heptane (2.22 mmol/ml) was added to the flask. It was stirred for one hour. Then 1.3 ml of TiCl$_4$ in heptane (2.52 mmol/ml) was added to the flask. It was stirred for one hour. The slurry mixture was filtered and all solvents removed from the collected solid under a nitrogen purge. Catalyst yield was 3.4 grams of pale tan free-flowing powder.

COMPARATIVE EXAMPLE 2

In a 250 ml 3-neck round bottom flask equipped with paddle stirrer, 5.0 grams of MS-3040F silica support (dried ten hours under a nitrogen purge at 150° C.) was slurried in 125 ml heptane. Next, 7.0 ml of butylethylmagnesium in heptane (0.67 mmol/ml) was added to the silica/heptane slurry. It was stirred for one hour. Then, 1.8 ml of 1-butanol in heptane (2.63 mmol/ml) was added to the flask. It was stirred for one hour. Then, 8.1 ml of TiCl$_4$ in heptane (0.58 mmol/ml) was added to the flask. It was stirred for one hour. The slurry mixture was filtered and all solvents removed from the collected solid under a nitrogen purge. Catalyst yield was 5.7 grams of pale coral free-flowing powder.

COMPARATIVE EXAMPLE 3

In a 250 ml 3-neck round bottom flask equipped with paddle stirrer, 4.7 grams of a high pore volume (3.0 cc/g), medium surface area (500 m$^2$/g) microspherical silica support chemically treated to convert silanol groups to trimethylsiloxy groups (PQ designation MS-3050F, dried ten hours under a nitrogen purge at 150° C.) was slurried in 100 ml heptane. Next, 7.7 ml of butylethylmagnesium in heptane (0.67 mmol/ml) was added to the silica/heptane slurry. It was stirred for one hour. Then, 2.0 ml of 1-butanol in heptane (2.63 mmol/ml) was added to the flask. It was stirred for one hour. Then, 8.9 ml of TiCl$_4$ in heptane (0.58 mmol/ml) was added to the flask. It was stirred for one hour. The slurry mixture was filtered and all solvents removed from the collected solid under a nitrogen purge. Catalyst yield was 5.4 grams of coral free-flowing powder.

Polymerization Process

In a 500 ml Fischer-Porter bottle under nitrogen, about 150 ml heptane and 1.0 ml of 25 wt % TEAL/heptane was added. The solution was purged with ethylene for ten minutes. Then 10 to 20 mg of the catalyst was added. The bottle was placed in an oil bath heated to 70° C. and ethylene fed continuously on demand to the polymerization reaction mixture at 5 psig. After one hour, the reaction was stopped and the contents of the flask transferred into a drying tray. All solvents were removed from the polymer in a fume hood.

The following activities were obtained.

| Example | Support | Ti, Mg Loading | Surface Area | Activity |
|---------|---------|----------------|--------------|----------|
| Inv. 1  | MS-3070F | 1.15 mmol/g   | 700 m$^2$/g  | 79 g/mmol Ti |
| Comp. 1 | MS-3040F | 0.94          | 400          | 44       |
| Inv. 2  | MS-3070F | 1.10          | 700          | 75       |
| Inv. 3  | MS-3060F | 1.10          | 600          | 84       |
| Comp. 2 | MS-3040F | 0.94          | 400          | 51       |
| Comp. 3 | MS-3050F | 1.10          | 500          | 46       |

These results were completely unexpected. These examples show that very high surface area is beneficial to catalyst activity on a per Ti basis. Although increasing the loading might give higher catalyst activity on a per gram catalyst basis, it was totally unexpected that on a per Ti basis, catalyst activity would increase. Furthermore, comparing Inventive Examples 2 and 3 and Comparative Example 3, even though the Ti, Mg loadings are the same, the activity of the catalyst on the higher surface area support is higher.

Although illustrated and described with reference to certain specific embodiments, the present invention is nevertheless not intended to be limited to the details shown. Rather various modifications may be made in the details within the scope and range of equivalents of the claims and without departing from the spirit of the invention.

What is claimed:

1. A silica-containing α-olefin polymerization catalyst comprising:
    a porous silica support component comprising silica gel particles having:
        a) an average surface area of about 600 to about 800 m$^2$/g of silica, and
        b) an average pore volume of about 2.5 to about 4.0 ml/g of silica; and
    a Ziegler-Natta catalytic component comprising a complex product of a transition metal halide and a metal alkyl, wherein said catalytic component is incorporated on said silica support.

2. The catalyst of claim 1, wherein said silica particles have an average surface area of about 650 to about 750 m$^2$/g of silica and an average pore volume of about 2.75 to about 3.25 ml/g of silica.

3. The catalyst of claim 2, wherein said silica particles have an average surface area of about 700 m$^2$/g of silica and an average pore volume of about 3.0 ml/g of silica.

4. The catalyst of claim 1, wherein said silica particles have an average diameter of from about 20 micrometers to about 200 micrometers.

5. The catalyst of claim 1, wherein said silica particles have an average total surface hydroxyl content of from about 0.6 mmol/g to about 4.0 mmol/g.

6. The catalyst of claim 1, wherein said silica particles have a ratio of average pore volume (in ml/g) to average surface area (in m$^2$/g) between about 0.0037:1 to 0.0050:1.

7. The catalyst of claim 6, wherein said ratio is about 0.0043:1.

8. A silica-containing α-olefin polymerization catalyst comprising:
    a porous silica support component comprising silica gel particles having:
        a) an average surface area of about 600 to about 800 m$^2$/g of silica, and
        b) an average pore volume of about 2.5 to about 4.0 ml/g of silica; and
    a Ziegler-Natta catalytic component comprising a complex product of a magnesium alkyl and a transition metal halide having the formula MX$_4$, wherein X is a halide or an alkoxy halide having an alkyl group between 1 and 10 carbon atoms, wherein said catalytic component is incorporated on said silica support.

9. A silica-containing α-olefin polymerization catalyst comprising:
    a porous silica support component comprising silica gel particles having:
        a) an average surface area of about 700 m$^2$/g of silica,
        b) an average pore volume of about 3.0 ml/g of silica,
        c) an average diameter of from about 20 micrometers to about 200 micrometers, and
        d) an average total surface hydroxyl content of from about 0.6 mmol/g to about 4.0 mmol/g, and
    a Ziegler-Natta catalytic component comprising a complex product of a transition metal halide and a metal alkyl, wherein said catalytic component is incorporated on said silica support.

* * * * *